April 2, 1946.    R. R. VOUGHT ET AL    2,397,712
DIVE ANGLE INDICATOR
Filed May 15, 1943
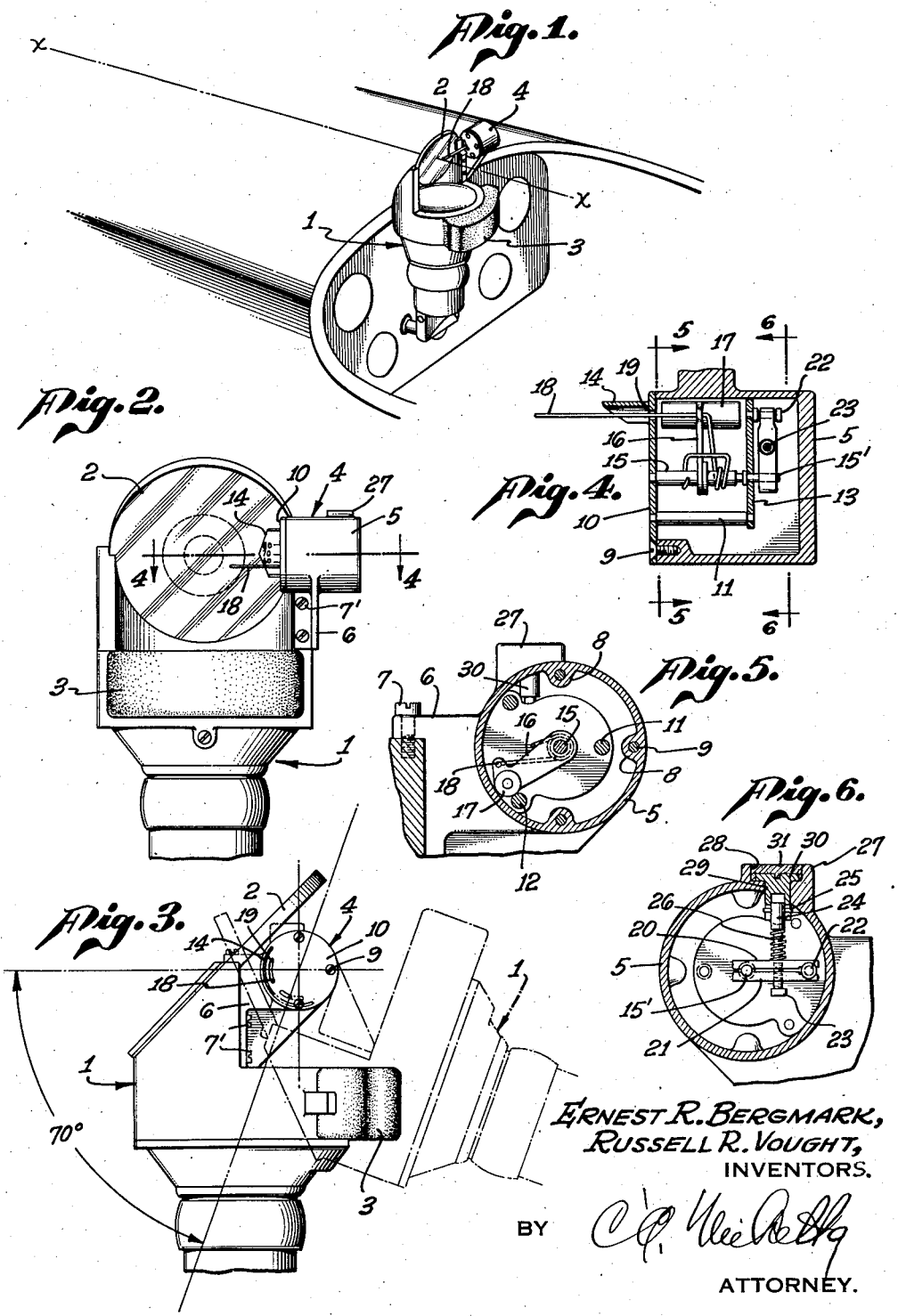
ERNEST R. BERGMARK,
RUSSELL R. VOUGHT,
INVENTORS.

Patented Apr. 2, 1946

2,397,712

UNITED STATES PATENT OFFICE 2,397,712

DIVE ANGLE INDICATOR

Russell R. Vought, Beverly Hills, and Ernest R. Bergmark, Los Angeles, Calif.; said Bergmark assignor to said Vought Application May 15, 1943, Serial No. 487,182

4 Claims. (Cl. 33—46.5)

This invention pertains to a dive angle indicator adapted to be mounted upon aircraft, said indicator being gravitationally actuated and adapted to indicate to the operator of an aircraft the angle at which the aircraft is inclined with respect to the horizontal plane. The indicator, motivated by gravity-responsive means, traverses the line of sight of the pilot or gunner so as to permit such pilot or gunner to maintain his eyes upon the target and at the same time receive indications concerning the angle of the dive, thereby obviating the necessity of shifting his eyes from the target to a separate instrument or indicator even for a fractional period of time.

In dive bombing, the airplane carrying the bombs dies at high speed from a high altitude, the axis of the plane, immediately preceding release of the bomb, being directed upon the target. It is, of course, necessary that the pilot or bombardier follow the target accurately. Moreover, it has been found desirable to regulate and standardize the angle of dive so that after the bomb is released, the plane can pull out of the dive without excessive danger of "blacking" out the occupants of the plane or causing them to lose consciousness. By maintaining all dives at a predetermined angle, both in practice and in actual warfare, better results are obtained.

The present invention is directed to a gearless indicator for use on aircraft, such indicator including gravity-responsive means and an indicator operably connected thereto, said indicator being movable in a plane transverse to the direction of flight or direction of sight. By suitably adjusting the indicator of the present invention, the indicating arm or means may be caused to intersect the line of sight when a predetermined angle of dive is attained. The line of sight may be directed through a suitable sight mounted upon the aircraft, the sight not only permitting the pilot to properly direct the aircraft and its bomb but at the same time visually indicating to the pilot the approximate altitude of the aircraft or distance of the craft from the target. The latter result is ordinarily attained by the use of centering or speed rings adapted to intercept a predetermined area when viewed from a predetermined altitude or distance from the target.

While an airplane is in flight and maneuvering for position above a target, rapid and varying changes in inclination of the axis of the plane may take place even during a dive towards a target. The pilot may weave the ship for the purpose of confusing defending anti-aircraft. These various changes in angle and position of the ship, coupled with the vibration of the entire plane, ordinarily cause a dive indicator to flutter or vary to such an extent that an effective reading can not be obtained. The present invention utilizes the normal vibration of a ship to assist the movement of the indicator with changes in axial angle of the ship, so that a smooth, gradual, and easily observed reading can be had. Differently expressed, those forces which ordinarily disturb accurate readings are employed by the device of the present invention in obtaining a smooth action which facilitates reading of the instrument.

One of the objects of the present invention, therefore, is to disclose and provide a simple and effective dive angle indicator for use on aircraft.

A further object of the invention is to disclose and provide a dive angle indicator including gravity-responsive means adapted to motivate the indicator, as well as means for translating the motion of the gravity-responsive means into a motion of the indicator in a plane transverse to the direction of sight.

A still further object of the invention is to disclose a dive angle indicator provided with simple regulatable means for eliminating undue oscillation of the indicator, said means being adapted to absorb or minimize vibrations and rapid fluctuations in angle of dive whereby the operator is not confused by minor variations but instead is informed as to the mean or average angle of dive.

An object of the invention also is to disclose and provide a dive indicator capable of being attached to existing forms of projection sights without difficulty.

A further object is to disclose and provide a dive angle indicator which is simple in construction and assembly and which when once set and adjusted may be sealed, thereby obviating tampering and maladjustment during service.

These and other objects, uses and advantages of the present invention will become apparent to those skilled in the art from the following detailed description of an exemplary form of the invention. In order to facilitate understanding, the adaptation of the dive angle indicator to a projection type of sight will be described, it being understood that the indicator of the present invention may also be employed with other types of sight or in combination with other devices attached to or carried by an aircraft. The appended drawing will amplify the description given hereinafter.

In said drawing:

Fig. 1 is a perspective pictorial representation of a cockpit of an aircraft provided with a reflective type of rear sight and dive angle indicator of the present invention.

Fig. 2 is a front view of the reflective or projection type of sight provided with a dive angle indicator of the present invention.

Fig. 3 is a side view of the device illustrated in Fig. 2, the device being shown in normal horizontal flying position in full lines and in diving position in dotted lines.

Fig. 4 is a horizontal section taken along the plane 4—4 of Fig. 2.

Fig. 5 is a transverse section taken along the plane 5—5 of Fig. 4.

Fig. 6 is a transverse section taken along the plane 6—6 of Fig. 4.

By referring to Fig. 1 it will be noted that in the cockpit of the aircraft there is positioned a projection type rear sight including the housing 1 and an inclined reflecting member 2. The housing 1 may include a suitable light source, optical system and reticule whereby seat rings or centering rings are projected upon the reflector 2. The longitudinal axis of the aircraft is parallel to the line of sight x—x when the pilot looks through the inclined reflecting member 2 while maintaining his head in a normal position. A front sight, not shown, may be positioned on some point on the aircraft in advance of the reflector 2 for the purpose of more accurately directing the line of sight along a line parallel to the longitudinal axis of the aircraft. The projector sight 1 is firmly attached to the airplane and preferably only the inclined transparent reflector 2 projects above the instrument board, thereby not interfering with side vision. Light-absorbing or color filters may be pivotally attached to the sight 1 so as to obviate glare, the color filter discs being selectively movable into the line of sight x—x. A pad 3 of rubber or other resilient material may be attached to the front of the housing 1 to prevent injury to the pilot in the event of a crash landing.

The dive angle indicator is generally indicated at 4 and comprises a substantially cylindrical housing 5 which may be integral with a bracket 6 adapted to be attached to one of the wings supporting the transparent reflector 2, as by means of machine screws 7 and 7'. The housing 5 is provided with three integral internally extending bosses 8 adapted to receive screws 9 by means of which the cover 10 of a gage, including the studs 11 and 12 and the back plate 13, is attached to the housing. The gage, therefore, consists of the cover plate 10, studs such as 11 and 12, and the back plate 13, and carries the working elements of the dive angle indicator. The cover plate 10 may also carry a scale 14 marked with suitable indicia to facilitate reading the instrument.

A shaft 15 is journaled in the cover plate 10 and back plate 13 of the gage. The shaft 15 carries an arm 16 provided with a weighted member 17 at its outer end. An indicator, such as the wire 18, extends through an arcuate slot 19 formed in the cover plate 10 and is attached in any suitable manner to the arm 16. In Fig. 4 the wire 18 is shown passing through a portion of the arm 16 and then winding around the shaft 15.

The shaft 15 extends through the back plate 13 and terminates in a portion of reduced diameter indicated at 15'. This portion 15' is preferably on the order of 0.06 inch or less in diameter. Shafts having a diameter of 0.03 inch have been used with advantage. This reduced portion of the shaft is grasped between two opposing presser blocks 20 and 21 provided with semi-concave portions adapted to partially encircle and frictionally grasp the reduced portion 15'. These opposing presser blocks 20 and 21 are movably held at their opposing ends by means of a stud 22 carried by the back plate 13. The lower presser block 21 is provided with an internally threaded bore, extending in a direction transverse to the axis of shaft 15 or 15', said internally threaded bore being adapted to receive and engage a threaded bolt 23 (best shown in Fig. 6). The upper presser block 20 is provided with a bore adapted to loosely receive the bolt 23. The end of the bolt is provided with clutch means whereby the bolt may be rotated. Such clutch means are shown in the exemplary form as constituting a cylindrical portion 24 provided with a diametrically extending pin or opposing lugs 25. An expansion spring 26 is positioned between the upper block 20 and the head 24.

The housing 5 is also provided with a boss 27 provided with a recess 28 and a bore 29, which bore slidably receives a cylindrical clutch element 30 provided with a slotted head and a bifurcated lower end portion, the bifurcated lower end portion being adapted to encircle and grasp the head 24 of the bolt 23. The upper clutch member 30 may therefore be lowered into engagement with the head 24 and rotated until the spring 26 is compressed to an extent sufficient to give the required gripping action between the presser blocks 20 and 21, and the reduced portion 15' of the shaft 15. The depression 28 of the boss 27 is then filled with easily fusible metal, wax or other material 31 so as to prevent tampering with the instrument.

As indicated in Fig. 5, when the aircraft provided with this dive indicator is flying along a substantially horizontal course, the counterweight 17 rests against the stud 12 and the device is inoperative. When the longitudinal axis of the aircraft comes within 15 or 20 degrees of the desired angle of dive, however, the counterweight 17 is free to move and moves the indicator 18 with respect to the scale 14. It has been found that the presser blocks 20 and 21 may be made of stainless steel, brass or other non-corrosive metal or other material and by working on a minute reduced portion of the shaft 15, permit the indicator 18 to move in a smooth, even and accurate manner without undue oscillation or fluttering. The pilot may readily observe the indicator while looking through the sight glass 2. In its preferred form, the dive angle indicator 4 is so positioned that the indicator 18 is in line with the horizontal axis through the center of the sight 2 when the plane is at the desired diving angle. The position assumed by the parts when the aircraft is at the desired diving angle is shown in dotted lines in Fig. 3. There it is assumed that the desired diving angle is 70 degrees. It is understood, however, that the device may be adjusted for other predetermined and desired diving angles.

It is to be noted that the gravity-responsive means or weight 17 is movable in a plane parallel to the direction of sight whereas the index member or indicator 18 moves in a plane substantially transverse to the direction of sight. It is also to be noted that in the device described, no liquids, dash pots or other shock-absorbing devices are employed. An instrument of the character here described must function at temperatures ranging from 70° below zero to temperatures as high as 140° above zero and the use of liquids, viscous substances and other fluids has been found unsatisfactory under such great variations in temperature. The normal vibration of an airplane permits the gravity-responsive means 17 to move while the presser blocks 20 and 21 suitably iron out all irregularities in movement without impairing accuracy.

We claim:

1. In a dive angle indicator for use on aircraft, the combination of: a housing; a cage slidable into the housing, said cage including a face plate adapted to form the closure for said housing; gravity responsive means carried by the cage, said means being mounted upon a shaft transverse to the direction of sight and flight of the aircraft; an arcuate aperture in the face plate, an indicator attached to the gravity responsive means and extending through said aperture and adapted to move in a plane virtually transverse to the direction of sight and flight of the aircraft and perpendicular to the face plate; the shaft being provided with a portion having a diameter of not over about 0.06 inch; a pair of metallic presser blocks carried by the cage and adapted to grasp the shaft at its reduced diameter portion; spring means for urging said presser blocks into pressure contact with the shaft at all times; and means carried by the housing and accessible from outside the housing for adjusting the spring means.

2. In a dive angle indicator for use on aircraft, the combination of: a housing; a cage slidable into the housing, said cage including a face plate adapted to form a closure for said housing; a back plate and studs maintaining said plates in spaced relation; gravity responsive means carried by the cage, said means being mounted upon a shaft transverse to the direction of sight and flight of the aircraft, said gravity responsive means resting on one of said studs when the aircraft is in substantially level flight; an arcuate aperture in the face plate; an indicator attached to the gravity responsive means and extending through said aperture and adapted to move in a plane virtually transverse to the direction of sight and flight of the aircraft and perpendicular to the face plate; the shaft being provided with a portion of reduced diameter; a pair of presser blocks carried by the cage and adapted to grasp the shaft at its reduced diameter portion; spring means for urging said presser blocks into pressure contact with the shaft at all times, said means including a retainer; a recessed boss in the outer surface of the housing; and a movable adjustment member within said recess, said member extending into the housing and engaging the retainer for said spring whereby the pressure exerted by the spring upon the presser blocks may be adjusted.

3. In combination with a projection type sight, a dive angle device attached thereto, said device including a gravity responsive means mounted upon a rotatable shaft, said gravity responsive means being movable in a plane parallel to the direction of sight and flight of the aeroplane; a scale carried by the device in a plane substantially transverse to the line of sight and flight; an indicator connected to and movable with the gravity responsive means, said indicator extending transversely across the scale and beyond the scale across the line of sight and flight of the aeroplane and into the field of view of the projection type sight, said indicator being movable transversely to said line of sight and flight; and friction means cooperating with a reduced portion of the rotatable shaft for inhibiting excessive oscillation of said indicator.

4. In combination with an aeroplane adapted to dive at an acute angle relative to the horizontal, a direction sight member on the fuselage directly in front of the cockpit having a position in a line of sight parallel to the line of flight of the aeroplane, a dive angle device mounted immediately adjacent and laterally relative to the direction sight, said dive angle device including a shaft rotatable in a plane perpendicular to the line of sight, gravity responsive means pivotally suspended from the shaft and movable in a plane parallel to the line of sight, a dive angle scale set in position wherein an indicator for a predetermined angle of dive is centered relative to the line of sight and an indicator fixed to the gravity responsive means having an indicating extension protruding laterally from the dive angle device and movable in an arc parallel to the line of sight and having a position when the predetermined dive angle has been reached by the plane coinciding with the indicator on the scale and directly in line with the line of sight.

RUSSELL R. VOUGHT.
ERNEST R. BERGMARK.